Jan. 6, 1942. C. E. MUELLER Re. 21,995

SPOOL SNUBBER

Original Filed July 9, 1936

INVENTOR.
Carl E. Mueller

BY Chester W. Brown
ATTORNEY.

Reissued Jan. 6, 1942

Re. 21,995

UNITED STATES PATENT OFFICE 21,995

SPOOL SNUBBER

Carl E. Mueller, Milwaukee, Wis., assignor to General Printed String Company, Milwaukee, Wis., a corporation of Wisconsin Original No. 2,152,909, dated April 4, 1939, Serial No. 89,798, July 9, 1936. Application for reissue August 17, 1940, Serial No. 353,131

14 Claims. (Cl. 242—134)

This invention relates to improvements in spool-snubbing devices.

It is the principal object of this invention to provide for twine spools, snubbing means which will permit free rotation of the spool when twine is being pulled therefrom, thereby offering a minimum resistance to removal of the twine from the spool, and which will immediately stop rotation of the spool when the twine is not being pulled therefrom, thereby preventing further removal of the twine from the spool.

More specifically, it is an object to provide a gravity-operated snubber engageable with the spool flanges and disengageable therefrom by means of the twine when the latter is being pulled from the spool, the snubber being immediately engageable with the flanges when the pulling force is no longer exerted upon the twine.

In the drawing.

Throughout the several views like parts are identified by the same reference characters.

Figure 2:
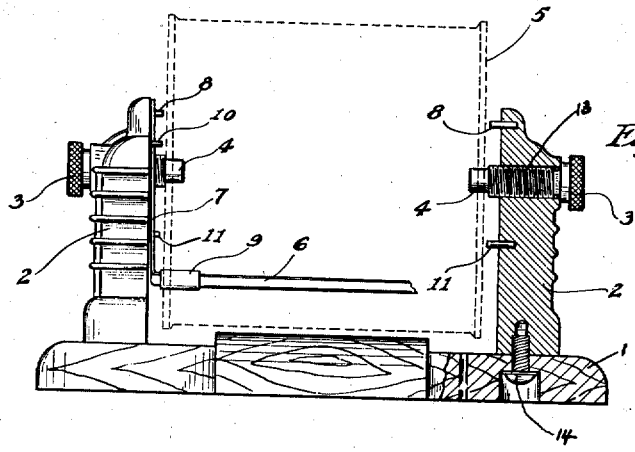
Fig. 2 is a view in side elevation, partly in section, of the device shown in Fig. 1.

The spool holder comprises a base 1 and a pair of uprights 2 in spaced relation to each other, and pivots 4 threaded through the uprights at 13 and each provided with a knurled flange 3. As shown in Fig. 2, the uprights are secured to the base 1 by means of stud bolts 14.

Each of the uprights 2 is provided at its upper end directly above the pivot 4, with a pin 8 upon which is mounted the U-shaped snubbing member 7. The intermediate portion 6 of the U-shaped member 7 which projects across the spool 5 is provided with a pair of rubber snubbing shoes 9 which engage the flanges on the spool 5.

The spool 5 is rotatably mounted upon the pivots 4, which latter may be adjusted in their respective uprights 2 by manual rotation thereof through the knurled flanges 3.

Figure 1:
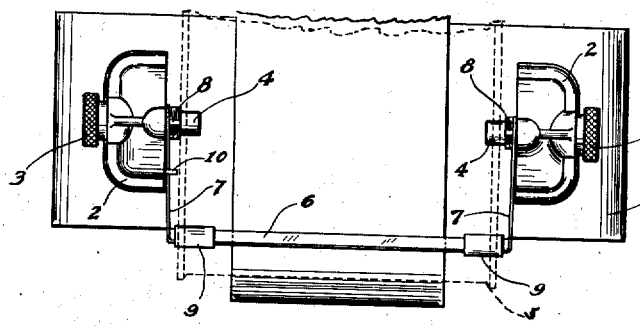
Fig. 1 is a top plan view of an embodiment of this invention, a portion being broken away.
Figure 3:
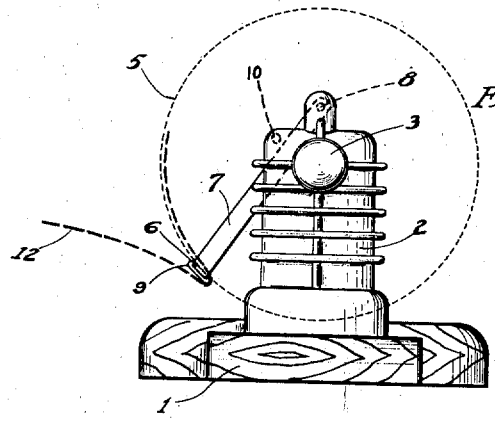
Fig. 3 is a view in end elevation of the same device.

The spool 5 has been illustrated in broken lines and as shown in Fig. 3, the twine 12 is also shown in heavier broken lines as it comes from the spool. This twine 12 passes beneath the portion 6 of the U-shaped snubbing member 7 and when pulled from the spool, will lift the snubbing member vertically about its supporting pins 8. However, this vertical movement is limited by means of a pin 10 shown on the left-hand upright 2 in Figs. 1 and 2. When the U-shaped snubber is thus moved vertically, the snubbing shoes 9 will be moved away from the spool flanges and permit the spool to be rotated by pulling the twine 12 therefrom.

A feature of the invention above described resides in the manner in which the snubbing shoes 9 cooperate with the flanges 5 of the spool. As clearly shown in Fig. 3, the arms of the snubbing member 7 extend downwardly from the pivot pins 8 and across the horizontal plane passing through the axis of the spool. Thus the snubbing shoes 9 are disposed in a position relative to the flanges 5 which produces a true snubbing action upon the spool as distinguished from a braking action.

It will be noted that the pivot or pin 8 for the snubbing members 7 is positioned between the axis of the spool 5 and the periphery of the spool flanges and that the snubbing shoes 9 move in an arc about the pin 8 which intersects the periphery of the spool flanges. As a result, a biting action of the shoes 9 upon the periphery of the spool flanges is performed when the snubbing member is free to engage the spool flanges.

As soon as the pulling force upon the twine 12 is relieved, the twine becomes sufficiently slack due to the rotation of the spool 5 and permits the U-shaped snubbing member 7 to drop vertically until the snubbing shoes 9 are engaged with the spool flanges. Immediately upon engagement of the snubbing shoes 9 with the spool flanges, the rotation of the spool is immediately stopped and no further slack allowed in the twine.

The snubbing action of the shoes 9 is rendered more efficient than previous prior art devices of this class by reason of the fact that the point of engagement of the shoes 9 with the flanges 5 and the pin 8 are disposed on opposite sides of the horizontal plane passing through the axes of the pivots 4 and substantially normal to the vertical plane which passes through the axes of the pivots 4 and pins 8. In this structure the flanges on the spool 5, when rotating in a counter-clockwise direction relative to Fig. 3, exert a tangentially directed force against the snubbers or snubbing shoes 9 when frictionally engaged therewith, and the U-member and pins 8 react through the shoes 9 against the tangentially directed force so that the resultant force engendered by these component forces is directed toward the interior of the circles defining the spool flanges. Consequently, the snubbers engage the flanges positively and with a minimum slippage between them. In other words, the spool is positively and instantly stopped when the snubbers engage its flanges.

It will be noted that pins 11 are provided beneath the pivots 4 and similarly located relative to the pivots 4 as the pins 8. The reason for providing these pins 11 is for mounting the U-shaped snubbing member 7 thereon, when the spool support is mounted in an inverted position. That is, as shown in the drawing, the spool support is mounted with the base beneath the spool, but there are locations where this device is used which necessitate mounting of the base above the spool 5. In such case, the snubbing member 7 would then be mounted upon the pins 11. It is deemed unnecessary to show this arrangement, because the operation of the device would be exactly the same as the operation heretofore described.

From the foregoing, it will be apparent that I have provided a spool snubbing device which is automatic in its snubbing movements and which in nowise interferes with rotation of the spool when twine is being pulled therefrom.

It will also be obvious from the foregoing that the invention herein described is simple in combination and therefore may be manufactured and assembled cheaply.

I claim:

1. In a spool holder, a supporting member having a pair of relatively spaced bearing supports, a twine bearing spool rotatably mounted on the bearings, and a spool snubber movable about a pivotal axis above said bearings, said snubber being normally engaged with the spool below a horizontal plane passing through the axis of said bearings and being automatically disengageable therefrom when rotative power is applied to the spool, by means of said twine, said twine being operative to disengage said snubber and said snubber being automatically engageable with the spool when said rotative power is not applied to said spool.

2. In a spool holder, a supporting member having a pair of relatively spaced bearing supports including spindles, a twine spool rotatably mounted on the spindles, a pivot on each of said bearing supports above the spindles thereof, and a snubber mounted on said pivots and having a portion normally engaging at least one of the flanges on said spool below the axis of said spool and extending across the spool to be engaged by said twine when the latter is being removed from the spool, thereby to remove the snubber from said flange.

3. In a spool holder, a supporting member having a pair of spaced bearing supports, each provided with a bearing spindle, a flanged twine spool rotatably supported by said spindles, a pivot positioned above said spindles and between the axes of said spindles and the periphery of the spool flanges, and a snubber mounted on said pivot and normally engaging said spool below a horizontal plane extending through the axes of said spindles and having a twine-engaging portion, whereby said snubber will be disengageable from said spool when the twine is pulled therefrom.

4. In a spool holder, a supporting member having a pair of spaced bearing supports, each provided with a bearing spindle, a flanged twine spool rotatably supported by said spindles, a pivot positioned above said spindles and between the axes of said spindles and the periphery of the spool flanges, a snubber mounted on said pivot and normally engaging said spool below a horizontal plane extending through the axes of said spindles and having a twine-engaging portion, whereby said snubber will be disengageable from said spool when the twine is pulled therefrom, and means limiting spool-disengaging movement of the snubber.

5. In a spool holder, a supporting member having a pair of spaced bearing supports, each provided with a bearing spindle, a flanged twine spool rotatably supported by said spindles, a pivot on each of said bearing supports having its pivotal axis above the axes of said spindles, a U-shaped snubber bar member mounted on said pivots and extending around said spool, said bar member normally engaging the flanges on said spool below a horizontal plane passing through the axes of said spindles, and twine on said spool extending therefrom and engageable with said bar member to remove the latter from the flanges when the twine is being drawn from the spool.

6. In a spool holder, a supporting member having a pair of spaced bearing supports, each provided with a bearing spindle, a flanged twine spool rotatably supported by said spindles, a pivot on each of said bearing supports having its pivotal axis above the axes of said spindles, a U-shaped snubber bar member mounted on said pivots and extending around said spool, said bar member normally engaging the flanges on said spool below a horizontal plane passing through the axes of said spindles, twine on said spool extending therefrom and engageable with said bar member to remove the latter from the flanges when the twine is being drawn from the spool, and stop means limiting flange-disengaging movement of the bar member.

7. In a spool holder, a supporting member having a pair of spaced bearing supports, each provided with a bearing spindle, a flanged twine spool rotatably supported by said spindles, a pivot on each of said bearing supports having its pivotal axis above the axes of said spindles, a U-shaped snubber bar member mounted on said pivots and extending around said spool, said bar member normally engaging the flanges on said spool below a horizontal plane passing through the axes of said spindles, and twine on said spool extending therefrom and engageable with said bar member to remove the latter from the flanges when the twine is being drawn from the spool, said bar member being provided with snubbing pads for engaging said flanges.

8. In a spool holder, a supporting member having a pair of spaced bearing supports, each provided with a bearing spindle, a flanged twine spool rotatably supported by said spindles, a pivot on each of said bearing supports having its pivotal axis above the axes of said spindles, a U-shaped snubber bar member mounted on said pivots and extending around said spool, said bar member normally engaging the flanges on said spool below a horizontal plane passing through the axes of said spindles, twine on said spool extending therefrom and engageable with said bar member to remove the latter from the flanges when the twine is being drawn from the spool, and stop means limiting flange-disengaging movement of the bar member, said bar member being provided with snubbing pads for engaging said flanges.

9. In a spool snubbing device, the combination with a pair of spaced upright bearing supports and a flanged spool rotatably mounted on said supports, of a U-shaped snubbing member having its arms pivotally mounted on said supports above the axis of rotation of said spool and extending downwardly across a horizontal plane extending through said axis, said member having a snubbing portion normally engaged with said flanges on said spool below said plane.

10. In a spool holder, the combination with a twine-bearing spool having a circular brake-flange rotatable therewith about a common axis and intended normally to rotate in one direction only, of a snubber element and a support for said snubber element operative to permit said snubber element to be moved into and out of frictional engagement with the peripheral surface of said brake-flange, said brake-flange exerting a tangentially directed force against said snubber when engaged therewith and rotating in said direction, said support being operative, when said snubber is engaged with said brake-flange, to react through said snubber against said tangentially directed force in such direction that the resultant force, engendered by said tangential and reacting components of force, is directed through said snubber from the exterior toward the interior of the circle defining said peripheral surface, and snubber actuating means disposed in the path of withdrawal of twine carried by the spool for moving the snubber from engagement with the flange during withdrawal operations and permitting engagement of the snubber and flange when withdrawal operations cease.

11. In a spool holder, the combination with a twine-bearing spool having a circular brake-flange rotatable therewith about a common axis and intended normally to rotate in one direction only, of a snubber element and a support for said snubber element operative to permit said snubber element to be moved into and out of frictional engagement with the peripheral surface of said brake-flange, said brake-flange exerting a tangentially directed force against said snubber when engaged therewith and rotating in said direction, said support being operative, when said snubber is engaged with said brake-flange, to react through said snubber against said tangentially directed force in such direction that the resultant force, engendered by said tangential and reacting components of force, is directed through said snubber from the exterior toward the interior of the circle defining said peripheral surface, snubber actuating means disposed in the path of withdrawal of twine carried by the spool for moving the snubber from engagement with the flange during withdrawal operations and permitting engagement of the snubber and flange when withdrawal operations cease, and a stop defining the limit of movement of the snubber member out of engagement with the brake-flange.

12. In a spool holder, the combination with a twine-bearing spool having a brake-flange rotatable therewith about a common axis and intended normally to rotate in one direction only, of a snubber element and a support therefor operative to permit said snubber element to be moved into and out of frictional engagement with said flange, said flange exerting a force against said snubber when engaged therewith and rotating in said direction, said support being operative, when said snubber is engaged with said flange, to react through said snubber against said force in such direction that the resultant force, engendered by first mentioned force and reacting components, is directed toward said flange to increase the frictional engagement with said flange, and snubber actuating means disposed in the path of withdrawal of twine carried by the spool for moving the snubber from engagement with the flange during withdrawal operations and permitting engagement of the snubber and flange when withdrawal operations cease.

13. In a spool holder, the combination with a twine-bearing spool having a circular brake-flange rotatable therewith about a common axis and intended normally to rotate in one direction only, of a fulcrum spaced from the axis of rotation of said flange, a lever mounted on said fulcrum, a snubber carried by said lever and frictionally engageable with the peripheral surface of said flange, said snubber engaging said surface at a point where said surface moves toward the plane intersecting said axis and fulcrum when said spool and flange are rotating in the aforesaid normal direction of rotation, and snubber actuating means disposed in the path of withdrawal of twine carried by the spool for moving the snubber from engagement with the flange during withdrawal operations and permitting engagement of the snubber and flange when withdrawal operations cease.

14. In a spool holder, the combination with a twine-bearing spool having a circular brake-flange rotatable therewith about a common axis and intended normally to rotate in one direction only, of a fulcrum spaced from the axis of rotation of said flange, a lever mounted on said fulcrum, a snubber carried by said lever and frictionally engageable with the peripheral surface of said flange, said snubber engaging said surface at a point where said surface moves toward the plane intersecting said axis and fulcrum when said spool and flange are rotating in the aforesaid normal direction of rotation, snubber actuating means disposed in the path of withdrawal of twine carried by the spool for moving the snubber from engagement with the flange during withdrawal operations and permitting engagement of the snubber and flange when withdrawal operations cease, and a stop defining the limit of movement of the snubber out of engagement with said flange.

CARL E. MUELLER.